United States Patent
Rüttiger et al.

(10) Patent No.: US 7,416,331 B2
(45) Date of Patent: Aug. 26, 2008

(54) CONDENSATION SENSOR

(75) Inventors: Anton Rüttiger, Wildflecken (DE);
Markus Peschel, Munnerstadt (DE)

(73) Assignee: Preh GmbH, Bad Neustadt/Saale ( * ) Notice: Subject to any disclaimer, the term of this patent is extended or adjusted under 35 U.S.C. 154(b) by 0 days.

(21) Appl. No.: 11/373,281

(22) Filed: Mar. 13, 2006

(65) Prior Publication Data

US 2006/0203879 A1 Sep. 14, 2006

Related U.S. Application Data

(63) Continuation of application No. PCT/EP2004/009986, filed on Sep. 8, 2004.

(30) Foreign Application Priority Data

Sep. 11, 2003 (DE) ................ 103 42 333

(51) Int. Cl.
G01K 13/00 (2006.01)
G01N 25/56 (2006.01)

(52) U.S. Cl. ............... 374/142; 73/25.04; 73/29.01; 374/27

(58) Field of Classification Search .......... 374/142
See application file for complete search history.

(56) References Cited

U.S. PATENT DOCUMENTS

| | | | | |
|---|---|---|---|---|
| 3,831,450 A | * | 8/1974 | Schipke et al. | 374/102 |
| 3,934,111 A | * | 1/1976 | Roselli et al. | 219/203 |
| 4,378,168 A | * | 3/1983 | Kuisma et al. | 374/28 |
| 4,503,707 A | * | 3/1985 | Rosa et al. | 374/142 |
| 4,801,211 A | * | 1/1989 | Yagi et al. | 374/28 |
| 4,816,748 A | * | 3/1989 | Tazawa et al. | 324/694 |
| 5,365,784 A | * | 11/1994 | Morrissey | 73/335.02 |
| 5,568,977 A | * | 10/1996 | Gschwind et al. | 374/45 |
| 5,739,416 A | * | 4/1998 | Hoenk | 73/29.01 |
| 5,801,307 A | * | 9/1998 | Netzer | 73/170.17 |
| 6,422,062 B1 | * | 7/2002 | King et al. | 73/29.01 |
| 6,809,530 B2 | | 10/2004 | Schmitt et al. | |
| 6,980,092 B2 | * | 12/2005 | Turnbull et al. | 340/425.5 |
| 2002/0032510 A1 | | 3/2002 | Turnbull et al. | |

(Continued)

FOREIGN PATENT DOCUMENTS

DE 197 22 577 A 12/1998

(Continued)

OTHER PUBLICATIONS

"Feuchtesensor für Klimaautomaten," Automobile Technical Magazine 102 (2000) 1, pp. 42-44.

*Primary Examiner*—Gail Verbitsky
*Assistant Examiner*—Mirellys Jagan
(74) *Attorney, Agent, or Firm*—Muncy, Geissler, Olds & Lowe, PLLC

(57) ABSTRACT

A measuring device for detecting a humidity and temperature of a window surface including at least one moisture sensor and at least one temperature sensor placed on the window surface, an evaluation unit connected downstream from the moisture and temperature sensors, and a signal converting and linking unit placed between the moisture and temperature sensors and the evaluation unit. Further, when the temperature sensor detects a change in a temperature of the window surface or the moisture sensor detects a change in a moisture of the window surface, a frequency of an oscillator included in the signal and converting unit is changed.

17 Claims, 2 Drawing Sheets

U.S. PATENT DOCUMENTS

| | | |
|---|---|---|
| 2003/0086475 A1 | 5/2003 | Polzer et al. |
| 2005/0028588 A1* | 2/2005 | Mitter ..................... 73/335.04 |
| 2005/0115308 A1* | 6/2005 | Koram et al. .................. 73/73 |
| 2005/0178200 A1* | 8/2005 | Stauss et al. ............. 73/335.02 |

FOREIGN PATENT DOCUMENTS

| | | | |
|---|---|---|---|
| DE | 199 07 401 A | | 8/2000 |
| DE | 19942286 C1 | * | 8/2000 |
| DE | 101 52 999 | | 5/2003 |
| EP | 950587 A1 | * | 10/1999 |
| FR | 2264957 A | * | 12/1975 |
| JP | 54115834 A | * | 9/1979 |
| JP | 62203855 A | * | 9/1987 |
| JP | 02120156 A | * | 5/1990 |

\* cited by examiner

CONDENSATION SENSOR

This non-provisional application is a continuation application of PCT/EP2004/009986, which was filed on Sep. 8, 2004, and which claims priority to German Patent Application No. DE 103 42 333.8, which was filed in Germany on Sep. 11, 2003, and which are both herein incorporated by reference.

BACKGROUND OF THE INVENTION

1. Field of the Invention

The invention relates to a measuring device for detecting the humidity and temperature of a window surface facing a vehicle interior, particularly of a vehicle windshield including at least one capacitive moisture sensor and at least one temperature sensor, which are placed together on the window surface, and a downstream evaluation unit. Further, measuring signals from the moisture and temperature sensors are combined into a single signal, and affect the shape of the single signal.

2. Description of the Background Art

Heating and air-conditioning systems provide a high level of interior comfort to passengers in a motor vehicle. Further, during the automatic operation of an air-conditioning system, various exterior conditions can lead to window condensation. For example, window condensation can occur during an extended recirculation operation, at low or fast-dropping exterior temperatures, or when not enough fresh air is being supplied to the inside of the automobile. In these instances, the relative air humidity inside the vehicle rapidly rises, which is also contributed to by the passengers of the vehicle. Thus, sensor systems are used to detect the formation of window condensation either directly on the window or in the environment with suitable sensors.

For example, the German application No. DE 199 07 401 illustrates a method for detecting a relative humidity whereby the relative humidity is measured and transmitted to a control device of a ventilating unit. That is, a moisture-sensitive sensor is glued to the interior side of the windshield to thereby detect window condensation. In addition, at the onset of window condensation, and even before the condensation becomes visible, a capacitance of the electrical sensor abruptly changes and the abrupt change is evaluated and transmitted to a control device of the ventilation unit to initiate suitable measures such as introducing fresh air to prevent fogging or condensation on the windshield.

Further, the article in the magazine Automobile Technical Magazine 102 (2000) 1, at pages 42-44, illustrates a sensor used to determines a relative humidity using a capacitive thin-film sensor, and measures the temperature of the window surface at the same time. In addition, the sensor is a highly sensitive infrared radiation detector based on thin-film thermal elements, which allows for a contact-free measurement of the temperature. The evaluating unit then calculates the dew point temperature after converting analog input signals of the relative air humidity and the corresponding temperature, and uses the calculated dew point to determine the possibility of condensation forming on the windshield. The sensors are also mounted to the rear side of the interior mirror at a distance from the windshield.

In addition, German Application No. DE 101 52 999 illustrates a sensor for detecting a propensity of condensation forming on a windshield. In this application, a sensor module is arranged directly on the windowpane and is used to measure the moisture on the window as well as the temperature of the window surface. The measured signals are then transmitted to an evaluation unit, which calculates a propensity for condensation forming on the windshield.

SUMMARY OF THE INVENTION

It is therefore an object of the present invention to provide a measuring device that is a simple, inexpensive sensor module, which transmits status data for a window surface regarding a tendency for condensation via only one signal line to prevent condensation on the window surface and which simultaneously supplies a temperature-independent measuring signal.

Another object of the present invention is to provide a method for detecting a temperature-independent measuring signal and to pass the temperature-independent measuring signal to a downstream control unit, which is used to prevent condensation from forming on the window.

To achieve these and other objects, the present invention provides a sensor module including a signal converting and linking unit placed between a plurality of measuring sensors and an evaluation unit and in which the converting and linking unit merges the different measurement signals into a merged signal. The merged signal is then passed to an evaluation unit. Thus, the converting and linking unit can be used to modulate a measuring signal so that only a single output signal is passed by the sensor module to the evaluation unit, whereby the measuring signal includes various status data for the window surface.

In addition, the analog measured values of the sensors serve as a measure for instantaneous conditions on the window surface. In one embodiment of the present invention, the temperature is measured by a resistor and the moisture on the window surface is measured by a moisture-sensitive capacitor. In addition, the two sensors are glued directly to the window surface using a thermally conductive film. Also, the capacitor functions as a frequency-determining component and is integrated directly into an oscillator circuit of the converting and linking unit, and the resistor functions as the temperature sensor and is superimposed on the oscillator circuit.

Preferably, a thermistor such as a Negative Temperature Coefficient (NTC) resistor is used as the temperature sensor. In addition, depending on the moisture on the surface of the window, a different capacitance is produced via the moisture sensor, as a result of which a frequency corresponding to the capacitance is generated in an oscillator. Thus, the frequency in the oscillator corresponds to a measure of the moisture on the surface of the window. Also, the resistor of the temperature sensor is superimposed on the oscillator such that a temperature-compensated frequency is present in the oscillator circuit.

In addition, at a constant relative humidity and variable temperature, the generated frequency remains virtually unchanged in the oscillator circuit. Further, the frequency generated in the oscillator is divided in a downstream frequency divider into a frequency that can be easily processed by an evaluation unit. The sensor module also outputs a square signal whose pulse length is a temperature-independent signal for the humidity of the window surface.

Thus, in accordance with an embodiment of the present invention, the determined measuring signals are merged in a signal converting and linking unit into a rectangular or square-shaped pulse signal and that the pulse signal is passed to an evaluation unit. Also, the capacitive sensor determines the frequency in the oscillator, and the analog signal of the resistor/temperature sensor is superimposed on the generated frequency so as to generate a temperature-independent measuring signal that is present as a special frequency for a frequency corresponding to the moisture on the window surface.

Further, the merging of the measuring signals from both sensors in accordance with the present invention is particularly advantageous because only one output signal compensated by the temperature needs to be output from the sensor module. The sensor module includes substantially the two sensors, the oscillator, and a frequency divider, and only one signal need be output to prevent condensation from forming on the window surface in accordance with the present invention.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
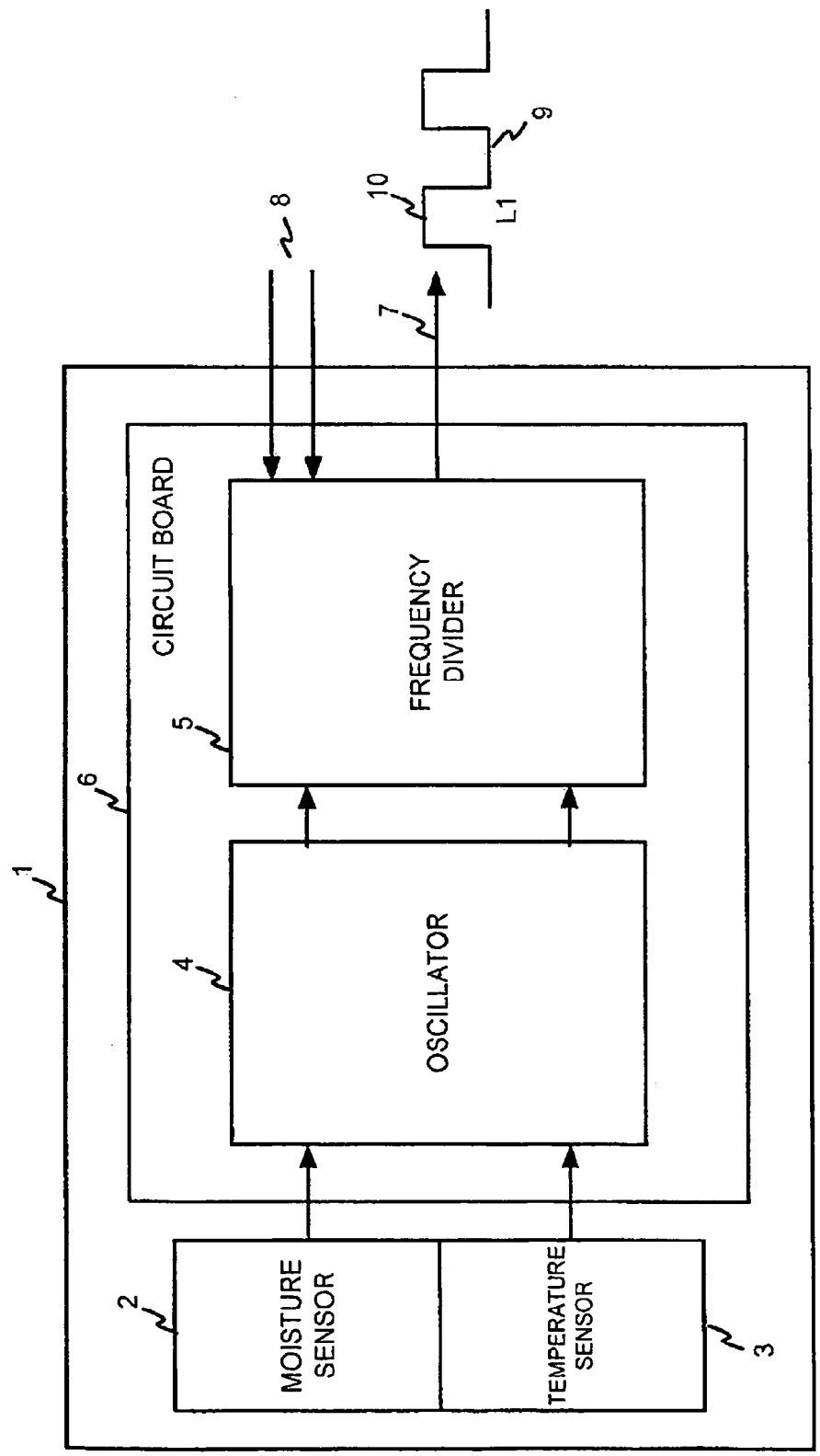
FIG. 1 is a block diagram of a sensor module in accordance with an embodiment of the present invention.

The present invention will now be described with reference to FIGS. 1 and 2. In more detail, FIG. 1 is a block diagram illustrating a sensor module 1 for measuring a humidity and temperature on a window surface. The relative humidity on the window surface is measured by a capacitive sensor 2 (moisture sensor), and the temperature of the window surface is measured by the resistor 3 (temperature sensor). Further, the resistor 3 is preferably a thermistor such as an NTC resistor.

In addition, the moisture sensor 2 and the temperature sensor 3 are glued directly to the windshield (not shown) via a thermally conductive film, whereby in one embodiment of the present invention, the sensor module 1 is placed as an entire unit directly on the window surface. Alternatively, the sensor module 1 can also be integrated into a rearview mirror placed on the windshield.

Further, as shown in FIG. 1, the sensor module 1 also include an oscillator 4 (e.g., an RC oscillator) connected downstream from the moisture sensor 2. Further, the moisture and temperature sensor 2, 3 are integrated into a circuit of the oscillator 4. Also, the frequency generated in the oscillator 4 is downconverted in a frequency divider 5 into a frequency that can be easily read by the evaluation unit. Also, the oscillator 4, the frequency divider 5 and other related circuit components are placed on a circuit board 6.

In addition, as discussed above, the sensors 2, 3 and the circuit board 6 are glued together to the surface of the window via the thermally conductive film. Also, to transmit an output signal 7 from the sensor module 1, an interface (not shown) to a bus system can be placed at the output of the frequency divider 5. The interface and a plug for the connection of a signal line are then also attached to circuit board 6.

Thus, the sensor module 1 substantially includes the two sensors 2, 3 and the circuit components placed on circuit board 6 including components for preventing signal linkage. In addition, the supply voltage for the circuit board 6 and related components is shown by arrows 8. Further, as shown in FIG. 1, the output signal 7 from the sensor module 1 is a pulse wave 9. In this instance, a length L1 of a pulse 10 is a direct measure of the tendency for condensation on the surface of the window, because a temperature-compensated measuring signal is present in the output signal 7.

Also, the linkage of the oscillator 4 with a resistor of the temperature sensor 3 to a frequency is particularly advantageous because a reaction time regarding the formation of condensation is significantly shortened and thus improved. In addition, using a self-adhering thermally conductive film for the mounting sensor module 1 on the surface of the window is also advantageous because the installation of the sensor module 1 to the window is made substantially easier.

Further, the moisture sensor 2 has a sandwich structure with a top electrode and a bottom electrode and a moisture-sensitive layer as a dielectric placed between the top and bottom electrodes. In addition, a dielectric constant of the layer between the electrodes changes based on the moisture on the window, which in turn leads to a change in capacitance within the capacitor. This change in capacitance also changes a frequency in the oscillator 4. In addition, to determined the relative room humidity, the temperature at the window surface is also preferably considered in addition to the determination of the absolute humidity on the surface of the window. Thus, the temperature sensor 3 is integrated into the circuit of oscillator 4 for temperature compensation.

Figure 2:
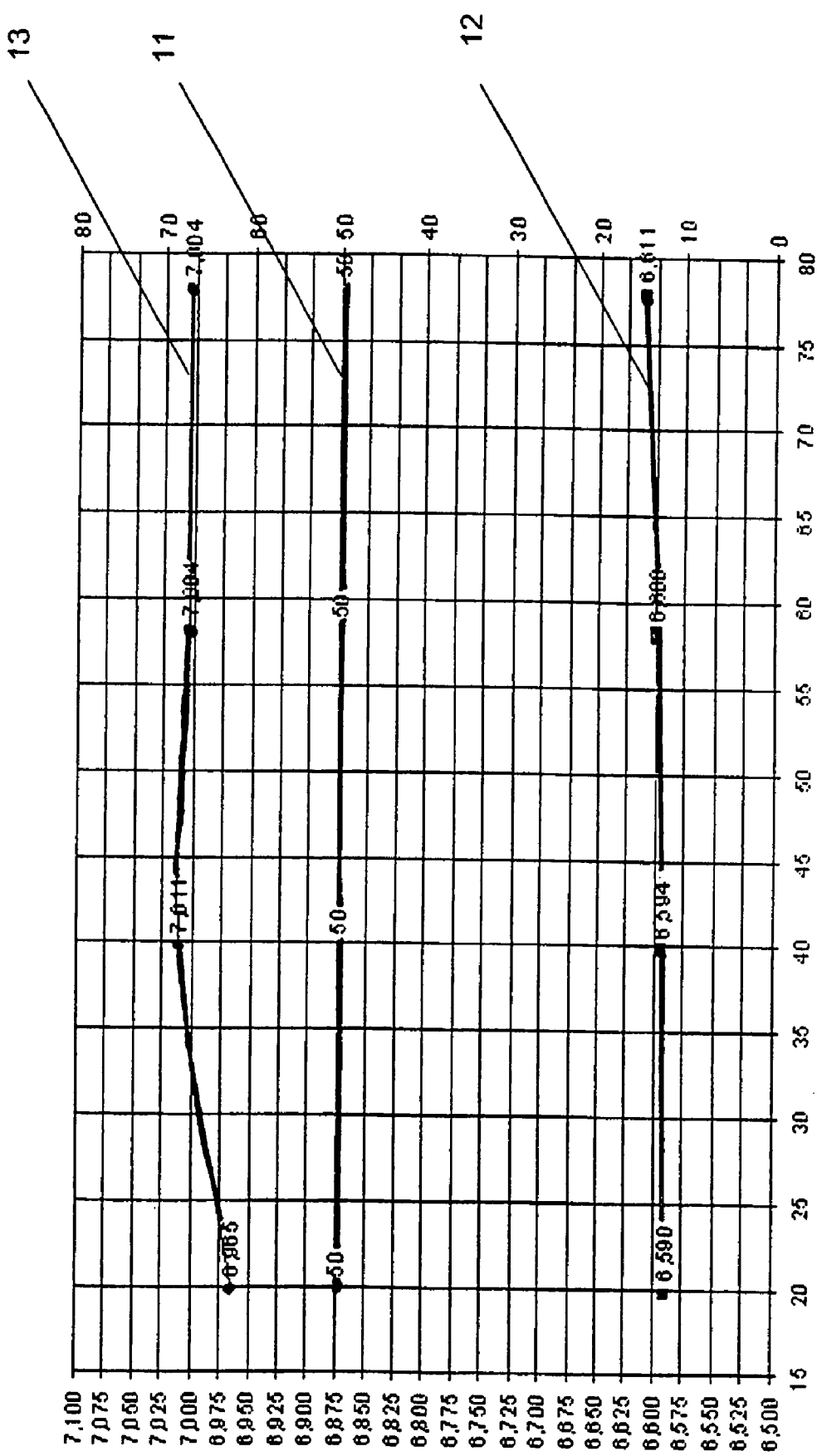
FIG. 2 illustrates a graph of an experimental test result in accordance with the present invention.

Turning now to FIG. 2, which illustrates the effect of the temperature sensor 3 relative to the frequency at the moisture sensor 2 at the output of the sensor module 1. As shown, the graph indicates the frequency in kHz and the corresponding temperature and the relative humidity as a percentage. In the measurement, a constant relative humidity of 50% was set and is shown as a straight line 11. The temperature was measured in degrees Celsius was also varied between 20° C. and about 80° C. In the experimental result, the almost linear course of the curve 12 in the lower part of the graph shows the frequency of the oscillator circuit at the capacitor 2. As shown, the frequency remains virtually constant over the entire temperature range. Similarly, the output signal 13 from sensor module 1 also remains virtually constant over the entire temperature range. Thus, FIG. 2 shows that the effect of the temperature in regard to the humidity measurement at the moisture sensor 2 is virtually eliminated.

In addition, as discussed above, the sensors 2, 3 and the circuit board 6 are glued via a self-adhesive thermally conductive film to the surface of the window. In addition, the sensors 2, 3 may be protected by covering them with a Teflon membrane. Further, the entire sensor module 1 can be surrounded by a plastic housing, whereby the area above and to the side of the sensors 2, 3 is open like a lattice. The Teflon membrane also protects the sensor components from dirt. In addition, the above-description refers to a rectangular-shaped signal. However, other types of signals such as a triangular or square-shaped signal may also be used.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measuring device for detecting a humidity and temperature of a window surface, comprising:

at least one moisture sensor and at least one temperature sensor placed on the window surface;

an evaluation unit connected downstream from the moisture and temperature sensors, an oscillator functionally coupled to the at least one moisture sensor and the at least one temperature sensor, wherein the oscillator receives an input signal from the at least one moisture sensor and an input signal from the at least one temperature sensor; and a signal converting and linking unit placed between the moisture and temperature sensors and the evaluation unit, wherein the signal converting and linking unit comprises the oscillator;

wherein when the temperature sensor detects a change in a temperature of the window surface or the moisture sensor detects a change in a moisture of the window surface, a frequency of the oscillator included in the signal and converting unit is changed.

2. The measuring device according to claim 1, wherein the temperature sensor comprises a resistor having a negative temperature coefficient.

3. The measuring device according to claim 1, wherein the moisture sensor comprises a capacitor with a moisture-sensitive intermediate layer.

4. The measuring device according to claim 1, wherein the window comprises a windshield of a vehicle.

5. The measuring device according to claim 1, wherein the signal converting unit outputs a single signal using the oscillator, wherein the single signal represents both the measured temperature and moisture.

6. The measuring device according to claim 1, wherein the signal converting unit merges the input signal from the at least one moisture sensor and the input signal from the at least one temperature sensor into a single signal, and wherein the signal converting unit outputs the single signal to the evaluation unit.

7. The measuring device according to claim 1, wherein the signal and converting unit further includes a frequency divider connected downstream from the oscillator.

8. The measuring device according to claim 7, wherein the oscillator and the frequency divider are placed on a common circuit board.

9. The measuring device according to claim 8, further comprising an interface to a bus system placed on the circuit board.

10. A measuring device for detecting a humidity and temperature of a window surface, comprising:

at least one moisture sensor and at least one temperature sensor placed on the window surface;

an evaluation unit connected downstream from the moisture and temperature sensors, a signal converting and linking unit placed between the moisture and temperature sensors and the evaluation unit, wherein the signal converting and linking unit comprises an oscillator functionally coupled to the at least one moisture sensor and the at least one temperature sensor; and wherein when the temperature sensor detects a change in a temperature of the window surface or the moisture sensor detects a change in a moisture of the window surface, a frequency of the oscillator included in the signal and converting unit is changed and the signal converting and linking unit outputs a single signal using the oscillator, said single signal representing both the measured temperature and moisture.

11. The measuring device according to claim 10, wherein the single signal comprises a rectangular-wave shaped signal in which a pulse length is a direct measure of a tendency for condensation on the window surface.

12. A method for detecting a measuring signal to determine a temperature and moisture of a window surface, said method comprising:

detecting the moisture of the window surface using a moisture sensor detecting the temperature of the window surface using a temperature sensor; and generating a single signal respectively corresponding to the detected humidity and temperature using an oscillator arranged downstream from the moisture and temperature sensors, wherein when the temperature sensor detects a change in a temperature of the window surface or the moisture sensor detects a change in a moisture of the window surface, a frequency of the oscillator is changed, further wherein the oscillator is linked to the temperature sensor to shorten the reaction time of the moisture sensor.

13. The method according to claim 12, wherein the temperature sensor comprises a resistor having a negative temperature coefficient.

14. The method according to claim 12, wherein the moisture sensor comprises a capacitor with a moisture-sensitive intermediate layer.

15. The method according to claim 12, wherein the frequency generated by the oscillator is divided in a downstream frequency divider.

16. A method for detecting a measuring signal to determine a temperature and moisture of a window surface, said method comprising:

detecting the moisture of the window surface using a moisture sensor;

detecting the temperature of the window surface using a temperature sensor; and generating a single signal respectively corresponding to the detected humidity and temperature using an oscillator arranged downstream from the moisture and temperature sensors, wherein when the temperature sensor detects a change in a temperature of the window surface or the moisture sensor detects a change in a moisture of the window surface, a frequency of the oscillator is changed, further wherein the oscillator is linked to the temperature sensor to shorten the reaction time of the moisture sensor and the single signal comprises a rectangular-wave shaped signal in which a pulse length is a direct measure of a tendency for condensation on the window surface.

17. The method according to claim 16, wherein the pulse length is changed when the detected moisture or temperature changes.

* * * * *